(12) United States Patent
Namiki

(10) Patent No.: US 11,577,622 B2
(45) Date of Patent: Feb. 14, 2023

(54) INFORMATION PROCESSING APPARATUS, INFORMATION PROCESSING METHOD, AND STORAGE MEDIUM

(71) Applicant: HONDA MOTOR CO., LTD., Tokyo (JP)

(72) Inventor: Shigeru Namiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 334 days.

(21) Appl. No.: 15/931,734

(22) Filed: May 14, 2020

(65) Prior Publication Data
US 2020/0386561 A1     Dec. 10, 2020

(30) Foreign Application Priority Data

May 22, 2019 (JP) .............................. JP2019-095955

(51) Int. Cl.
*H02J 7/00* (2006.01)
*B60L 53/80* (2019.01)
(Continued)

(52) U.S. Cl.
CPC .............. *B60L 53/80* (2019.02); *B60L 53/66* (2019.02); *B60L 58/12* (2019.02); *G01C 21/343* (2013.01);
(Continued)

(58) Field of Classification Search
CPC .......... B60L 53/66; B60L 53/80; B60L 58/12; G01C 21/343; G05D 1/0274; G06Q 30/0645; Y02T 90/12
(Continued)

(56) References Cited

U.S. PATENT DOCUMENTS

2013/0030581 A1* 1/2013 Luke ...................... B60L 1/02
                                                                       705/14.1
2015/0039391 A1* 2/2015 Hershkovitz ........... B60L 53/65
                                                                       705/7.31

FOREIGN PATENT DOCUMENTS

CN     102460073     5/2012
JP     57-012322    1/1982
(Continued)

OTHER PUBLICATIONS

Japanese Office Action for Japanese Patent Application No. 2019-095955 dated May 31, 2022.
(Continued)

*Primary Examiner* — Zixuan Zhou
(74) *Attorney, Agent, or Firm* — Amin, Turocy & Watson, LLP

(57) ABSTRACT

An information processing apparatus includes an acquirer that acquires first information indicating a remaining charge of a first battery that is detachably mounted in an electric vehicle and supplies electric power for traveling of the electric vehicle and second information regarding a destination of the electric vehicle, a travel route predictor that predicts a travel route of the electric vehicle based on the second information acquired by the acquirer, and a determiner that refers to map information indicating, on a map, positions of a plurality of charging stations at which a second battery to be rented to a user is charged and determines a charging station at which the second battery is rented as a replacement for the first battery mounted in the electric vehicle based on the travel route predicted by the travel route predictor.

5 Claims, 10 Drawing Sheets

(51) Int. Cl.
    *G06Q 30/0645*     (2023.01)
    *B60L 53/66*     (2019.01)
    *B60L 58/12*     (2019.01)
    *G01C 21/34*     (2006.01)
    *G05D 1/02*     (2020.01)

(52) U.S. Cl.
    CPC ....... *G05D 1/0274* (2013.01); *G06Q 30/0645* (2013.01); *Y02T 90/12* (2013.01)

(58) Field of Classification Search
    USPC .......................................... 320/109; 701/22
    See application file for complete search history.

(56) References Cited

FOREIGN PATENT DOCUMENTS

| | | |
|---|---|---|
| JP | 2011-197932 | 10/2011 |
| JP | 2014-527689 | 10/2014 |
| JP | 2014-228429 | 12/2014 |
| KR | 2008-0057649 | 6/2008 |
| WO | 2013/016555 | 1/2013 |
| WO | 2018/061415 | 4/2018 |

OTHER PUBLICATIONS

Chinese Office Action for Chinese Patent Application No. 202010359831.3 dated Oct. 28, 2022.

\* cited by examiner

FIG. 3
252

| BATTERY ID | SOC (%) | RESERVATION USER | RESERVATION TIME |
|---|---|---|---|
| 001 | 50 | - | - |
| 002 | 30 | - | - |
| 003 | 70 | 501 | 15:00 |
| ... | ... | ... | ... |

FIG. 4
431

| VEHICLE ID | VARIOUS SENSORS INFORMATION | ELECTRICITY CONSUMPTION INFORMATION | LATEST SOC (%) | DESTINATION INFORMATION | RESERVATION INFORMATION |
|---|---|---|---|---|---|
| C1 | ... | ... | 30 | HOME (P1) | 200A, 120A1... |
| C2 | ... | ... | ... | ... | ... |
| C3 | ... | ... | ... | ... | ... |
| ... | ... | ... | ... | ... | ... |

| SOC RANGE | TRAVEL DISTANCE RANGE |
|---|---|
| 90~100 (%) | 90~100 (km) |
| 80~90 (%) | 80~90 (km) |
| 70~80 (%) | 70~80 (km) |
| 60~70 (%) | 60~70 (km) |
| 50~60 (%) | 50~60 (km) |
| 40~50 (%) | 40~50 (km) |
| 30~40 (%) | 30~40 (km) |
| 20~30 (%) | 20~30 (km) |
| 10~20 (%) | 10~20 (km) |
| ... | ... |

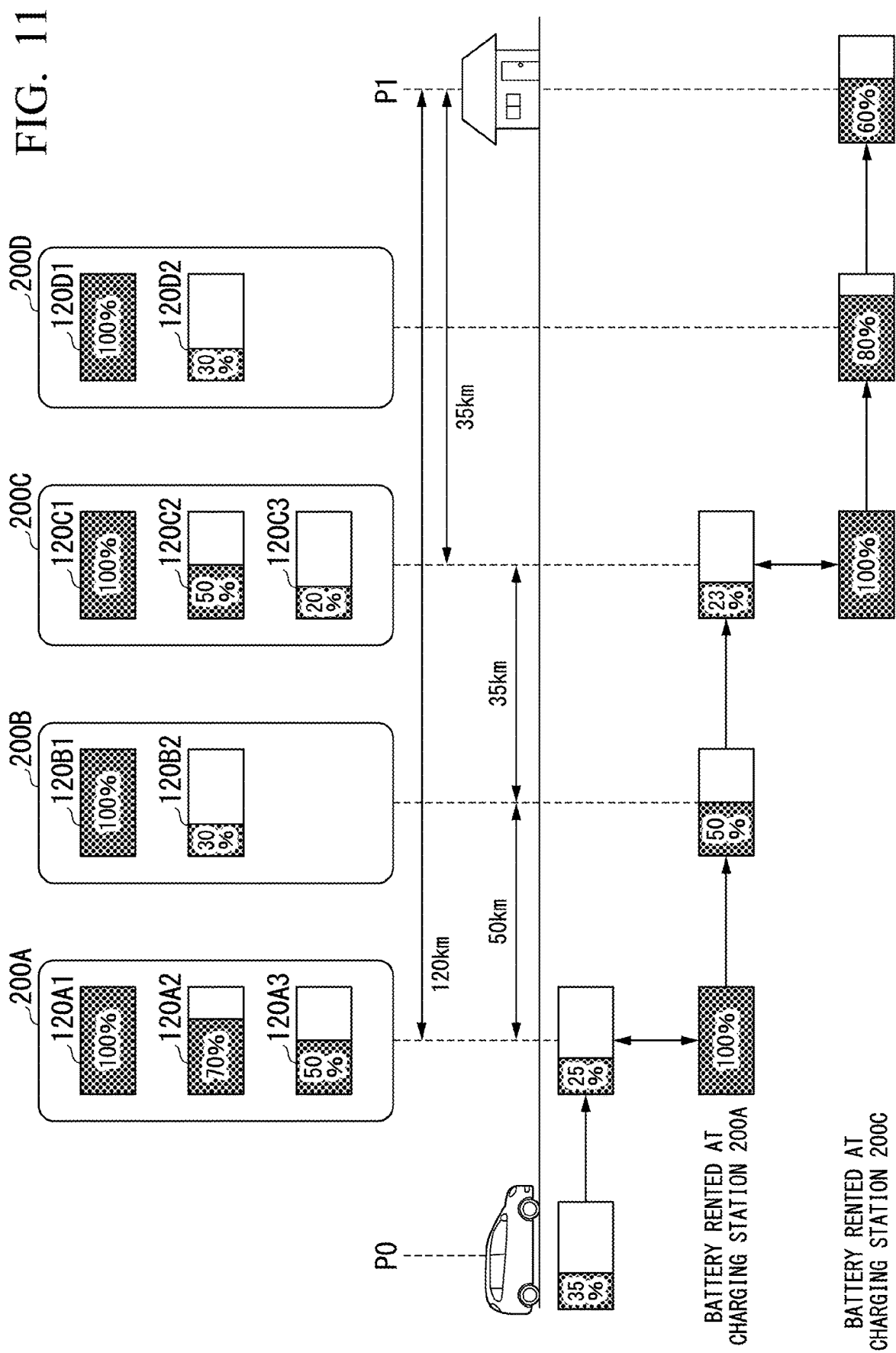

INFORMATION PROCESSING APPARATUS, INFORMATION PROCESSING METHOD, AND STORAGE MEDIUM

CROSS-REFERENCE TO RELATED APPLICATION

Priority is claimed based on Japanese Patent Application No. 2019-095955 filed on May 22, 2019, the content of which is incorporated herein by reference.

BACKGROUND

Field of the Invention

The present invention relates to an information processing apparatus, an information processing method, and a storage medium.

Description of Related Art

There is a battery sharing service as a service using detachable batteries, the service enabling such batteries to be rented from charging stations that are set up in multiple locations and batteries running out of electric power to be replaced at the charging stations. As a technology used in a replaceable battery sharing service, for example, there is a collection-charge-distribution apparatus in the related art that can collect, charge, and distribute detachable batteries in cases in which such detachable batteries are mounted in electric scooters and used and the electric power is consumed (WO2013/016555).

SUMMARY

In the replaceable battery sharing service in which such an above-described collection-charge-distribution apparatus is used, a user needs to search for a charging station having a replaceable battery by himself or herself and to determine a timing at which the user can stop at the charging station as well, which gives the user trouble.

A burden that may be imposed on the user when using the replaceable battery sharing service as described above has not been sufficiently discussed in the related art.

The present invention takes the above circumstances into account and aims to provide an information processing apparatus, an information processing method, and a storage medium that can reduce a burden on a user when using a replaceable battery sharing service.

The information processing apparatus, the information processing method, and the storage medium according to the present invention employ the following configurations.

(1) An information processing apparatus according to an aspect of the present invention includes an acquirer that acquires first information indicating a remaining charge of a first battery that is a first battery detachably mounted in an electric vehicle and supplies electric power for traveling of the electric vehicle and second information regarding a destination of the electric vehicle, a travel route predictor that predicts a travel route of the electric vehicle based on the second information acquired by the acquirer, and a determiner that refers to map information indicating, on a map, positions of a plurality of charging stations at which a second battery to be rented to a user is charged and determines a charging station at which the second battery can be rented as a replacement for the first battery mounted in the electric vehicle based on the travel route predicted by the travel route predictor.

(2) According to the above-described aspect (1), a remaining charge predictor that predicts a remaining charge of the first battery at a time point of arrival at a charging station among the plurality of charging stations on the travel route and a selector that selects the second battery to be rented at the charging station based on the remaining charge of the first battery predicted by the remaining charge predictor are further included.

(3) According to the above-described aspect (2), the selector selects a battery from a plurality of the second batteries, the battery having a remaining charge sufficient for the electric vehicle to travel to a charging station at which it is assumed the electric vehicle will next have the battery replaced or the destination of the electric vehicle.

(4) According to the above-described aspect (2), in a case in which the selector selects a second battery for replacement for a second electric vehicle having a longer travel distance to a charging station at which a battery is replaced next or a longer travel distance to a destination than a first electric vehicle among a plurality of electric vehicles with a battery to be replaced at the charging station, the selector selects a battery having a larger remaining charge than the second battery for replacement for the first electric vehicle based on information indicating a remaining charge of the second battery at the charging station.

(5) An information processing method according to an aspect of the present invention is a method for a computer to acquire first information indicating a remaining charge of a first battery that is a first battery detachably mounted in an electric vehicle and supplies electric power for traveling of the electric vehicle and second information regarding a destination of the electric vehicle, to predict a travel route of the electric vehicle based on the acquired second information, and to refer to map information indicating, on a map, positions of a plurality of charging stations at which a second battery to be rented to a user is charged and to determine a charging station at which the second battery can be rented as a replacement for the first battery mounted in the electric vehicle based on the predicted travel route.

(6) A storage medium according to an aspect of the present invention is for storing a program causing a computer to acquire first information indicating a remaining charge of a first battery that is a first battery detachably mounted in an electric vehicle and supplies electric power for traveling of the electric vehicle and second information regarding a destination of the electric vehicle, to predict a travel route of the electric vehicle based on the acquired second information, and to refer to map information indicating, on a map, positions of a plurality of charging stations at which a second battery to be rented to a user is charged and to determine a charging station at which the second battery can be rented as a replacement for the first battery mounted in the electric vehicle based on the predicted travel route.

According to the aspects (1) to (6) described above, a burden that may be imposed on a user when using a replaceable battery sharing service can be reduced.

BRIEF DESCRIPTION OF THE DRAWINGS

FIG. 3 is a table showing an example of battery management information.

FIG. 4 is a table showing an example of contents of vehicle management information.

FIG. 5 is a table showing an example of contents of correspondence table information.

FIG. 11 is a diagram illustrating an overview of the specific usage example of the sharing service (part 2).

DESCRIPTION OF EMBODIMENTS

Figure 1:
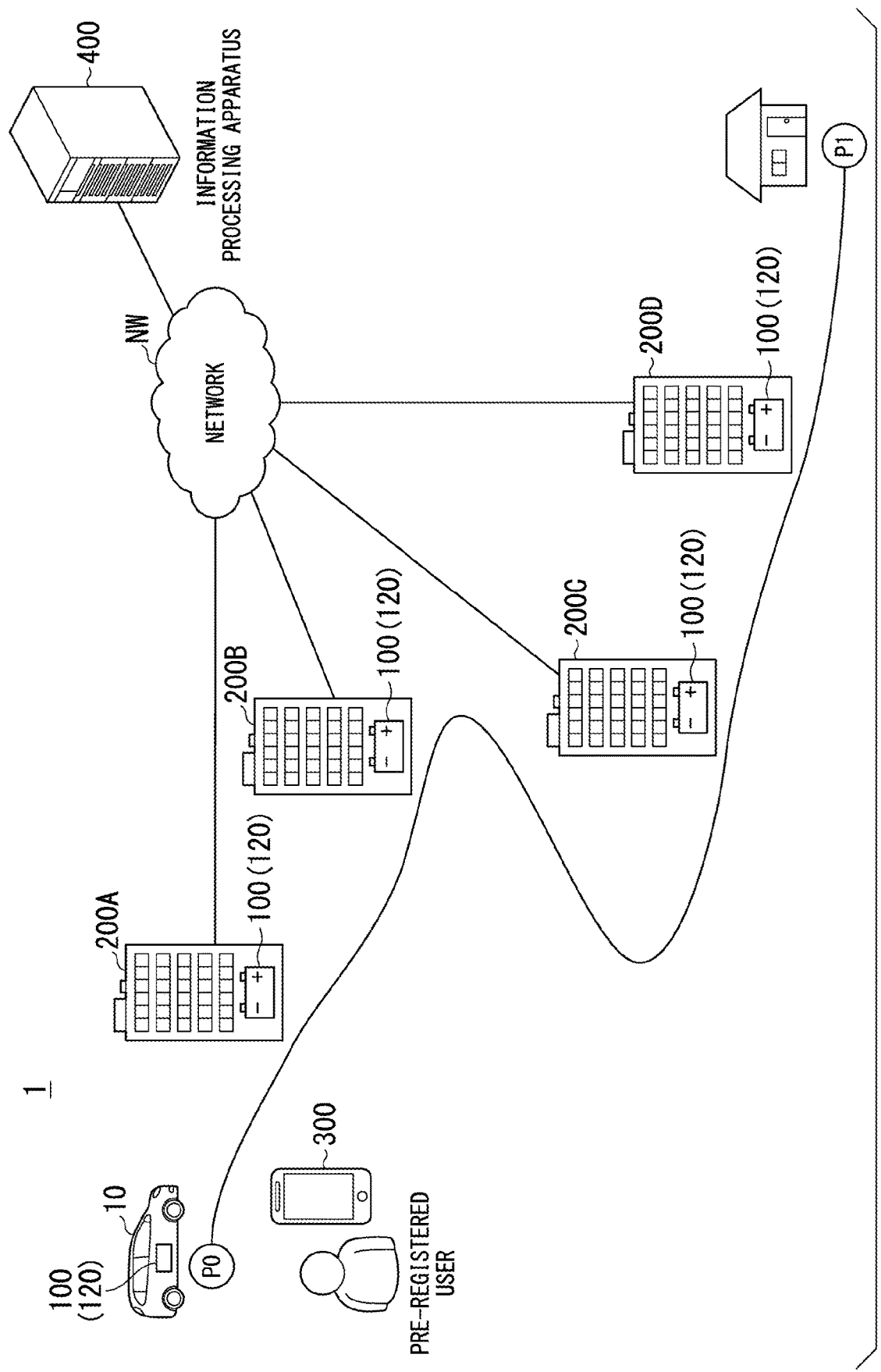
FIG. 1 is a diagram illustrating an overview of a sharing service system including an information processing apparatus of an embodiment.

Embodiments of an information processing apparatus, an information processing method, and a storage medium of the present invention will be described below with reference to the drawings. FIG. 1 is a diagram illustrating an overview of a sharing service system 1 including an information processing apparatus of the present invention. The sharing service system 1 includes at least one electric vehicle 10, a plurality of charging stations 200 (200A, 200B, 200C, 200D, . . . ), at least one mobile terminal 300, and an information processing apparatus 400. The sharing service system 1 provides a sharing service of sharing batteries 120 that have been charged in advance in the charging stations 200 with a plurality of users who have registered in advance for use of a sharing service by renting the charged batteries 120 to the users. If a user borrows a battery 120 that has already been charged in a charging station 200, the user does not need to wait until charging is completed in each station.

The electric vehicle 10 is a vehicle in which a battery unit 100 including a battery 120 is detachably mounted. The electric vehicle 10 is an automobile that includes an electric motor that is driven by electric power supplied from the battery 120 with the battery unit 100 mounted and travels as the electric motor is driven. The number of battery units 100 mountable in the electric vehicle 10 may be one or three or higher.

The electric vehicle 10 is, for example, a hybrid electric vehicle or a fuel cell vehicle that travels due to a combination of driving of the battery unit 100 and an internal combustion engine such as a diesel engine or a gasoline engine. The electric vehicle 10 is, for example, an automatic driving vehicle that includes a recognizer that recognizes the surroundings outside the vehicle and performs automatic driving based on recognition results of the recognizer. A configuration as an automatic driving vehicle will be described below. The electric vehicle 10 that is applicable to the sharing service system 1 may be, in addition to an electric automobile, a vehicle such as a saddle-type vehicle (electric motorcycle), an electric three-wheeler, an electric four-wheeler, or a hybrid vehicle, an electric kick skater, a robot, or the like. In the present embodiment, the electric vehicle 10 is an electric automobile.

The battery unit 100 is mounted in the electric vehicle 10 when the electric vehicle is rented to a user and is connected to a charger 230 (see FIG. 2) in the charging station 200 when the electric vehicle is not rented to any user. The battery unit 100 is, for example, of a cassette type in which the battery unit is detachable from the electric vehicle 10. The battery unit 100 (battery 120) is rented to a user in the charging station 200. The charging station 200 finishes charging of the battery 120 included in the battery unit 100 before the battery unit 100 is rented to a user.

Each of charging stations 200 is a facility for storing and charging the battery unit 100 and installed in a plurality of locations. The charging station 200 rents some of a plurality of stored battery units 100 to users who have already been registered and accepts returns of the battery units 100 rented to the users. The charging station 200 manages and charges the returned battery units 100 while waiting for a rent for the next user. A battery 120 being borrowed by the user and mounted in the electric vehicle 10 will be referred to as a first battery below. A battery 120 being managed in the charging station 200 and connected to the charger 230, for example, will be referred to as a second battery below.

The mobile terminal 300 is, for example, a terminal possessed by a user who requests use of the sharing service and, for example, a smartphone, a tablet terminal, a notebook personal computer, or the like. In the mobile terminal 300, a user agent (UA) such as an application program or a browser operates and supports the sharing service of the battery 120. A user notifies the information processing apparatus 400 of use of the sharing service, for example, using the mobile terminal 300.

The information processing apparatus 400 is communicatively connected to at least one electric vehicle 10, a plurality of charging stations 200, and a plurality of mobile terminals 300 via a network NW. The network NW includes, for example, the Internet, a wide area network (WAN), a local area network (LAN), provider equipment, a radio base station, and the like. The information processing apparatus 400 determines a usage schedule of the sharing service to be used by the electric vehicle 10 based on information received from the electric vehicle 10 and the charging stations 200. For example, the information processing apparatus 400 determines a charging station 200 in which the electric vehicle 10 replaces the battery unit 100 (which will be referred to as a replacement station below), a time at which a battery unit 100 is rented, a battery unit 100 to be rented to the electric vehicle 10, and the like, and informs the electric vehicle 10 or the mobile terminal 300 of the determined contents. The information processing apparatus 400 determines the usage schedule of the sharing service at, for example, a point at which the electric vehicle 10 departs, and selects a battery unit 100 for rent until the electric vehicle arrives at the replacement station. Details thereof will be described below.

The charging station 200 and the mobile terminal 300 can transmit and receive communication data to and from the information processing apparatus 400 via the network NW. The sharing service system 1 is a system that can provide the sharing service for a plurality of users to share the batteries 120 (battery units 100) each of which is a drive source of the electric vehicle 10. The information processing apparatus 400 manages a plurality of battery units 100, a plurality of charging stations 200, and a plurality of mobile terminals 300 in the sharing service system 1.

A user, for example, moves from a departure point P0 to a destination P1 using the electric vehicle 10. In the illustrated example, there are a plurality of charging stations 200A to 200D on the route from the departure point P0 to the destination P1. The user stops at the replacement station that is determined by the information processing apparatus 400 in advance among the plurality of charging stations 200A to 200D and rents a battery unit 100. If the replacement station determined by the information processing apparatus 400 is the charging station 200A, for example, when the user arrives at the charging station 200A with the electric vehicle 10, the battery unit 100 selected by the information processing apparatus 400 among the battery units 100 provided in the charging station 200A is mounted in the electric vehicle 10.

Then, when the amount of charge of the battery 120 of the battery unit 100 rented from the charging station 200A decreases, the user stops by a replacement station that has been determined by the information processing apparatus 400 in advance among the plurality of charging stations 200 and returns the battery unit 100. For example, the user stops by the charging station 200B with the electric vehicle 10 and returns the battery unit 100 rented from the charging station 200A. Then, the charging station 200B rents another battery unit 100 that has completed charging to the user. In this manner, the user replaces the battery unit 100 in the charging station 200B.

A replacement station in which the electric vehicle 10 replaces the battery unit 100 and the battery unit 100 rented to the electric vehicle 10 are determined by the information processing apparatus 400 and are reported to the electric vehicle 10 or the mobile terminal 300. The electric vehicle 10 may generate a route to the replacement station at which the electric vehicle 10 is likely to stop and travel on the generated route in automatic driving. The user may manually drive the electric vehicle 10 to stop by the replacement station based on the information reported to the mobile terminal 300. With this operation, the information processing apparatus 400 can determine the optimum charging station 200 and battery unit 100 with no need for the user to perform the operation of selecting the replacement station in which the electric vehicle 10 replaces the battery unit 100 and selecting another battery unit 100 to be rented to the electric vehicle 10. Therefore, a burden of the user is reduced and user convenience is improved. Details thereof will be described below.

Figure 2:
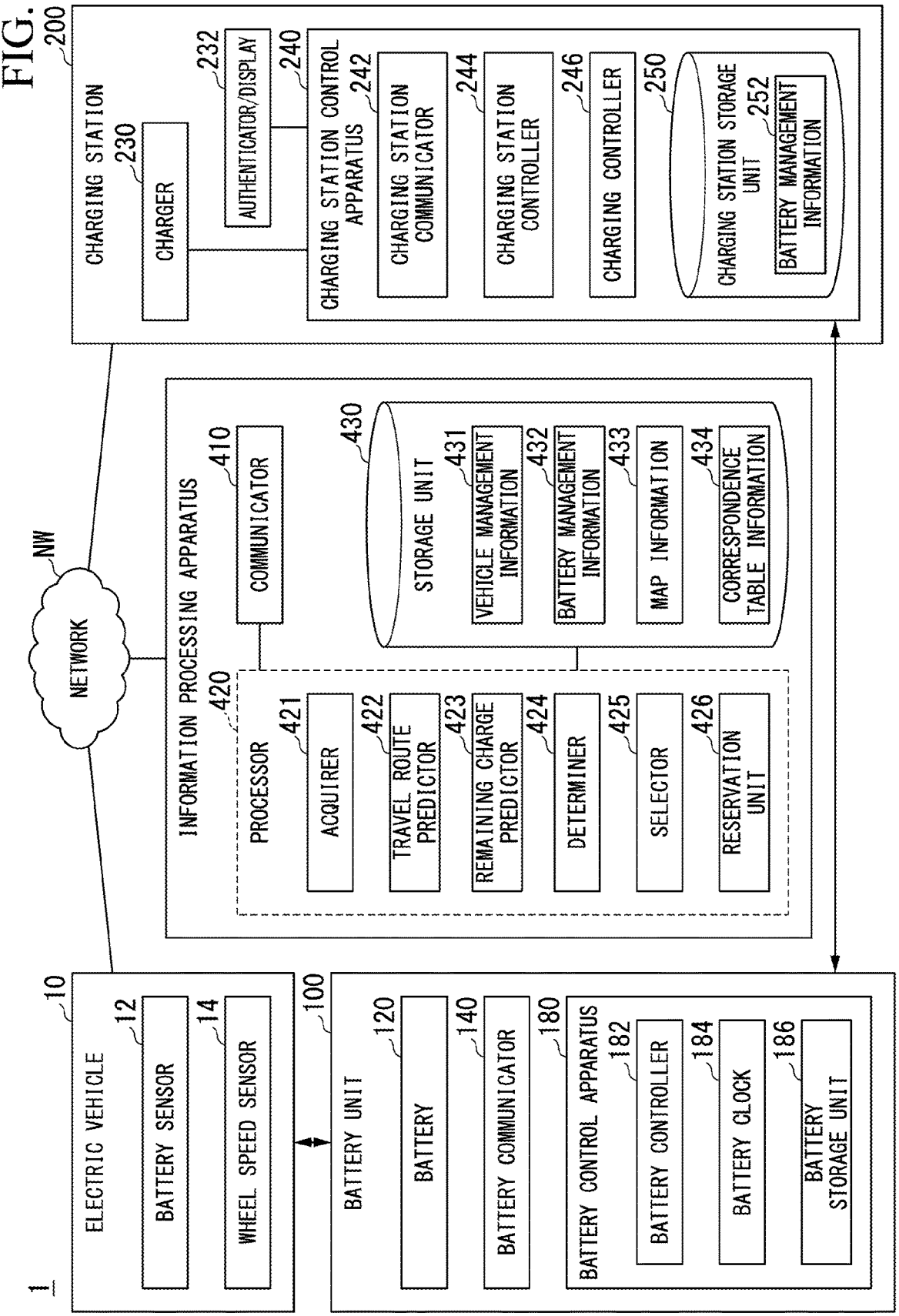
FIG. 2 is a diagram illustrating an overall configuration of the sharing service system including the information processing apparatus of the embodiment.

FIG. 2 is a diagram illustrating an overall configuration of the sharing service system 1. First, some configurations of the electric vehicle 10 will be described. The electric vehicle 10 includes, for example, a battery sensor 12 and a wheel speed sensor 14. The electric vehicle 10 can transmit and/or receive information to and/or from the mounted battery unit 100 via a communication line, or the like, which is not illustrated.

The battery sensor 12 includes various kinds of sensors, for example, a current sensor, a voltage sensor, a temperature sensor, and the like that detect a current value, a voltage value, and a temperature, and the like of the battery 120 of the mounted battery unit 100. The battery sensor 12 transmits the detection results of the various kinds of sensors to the battery unit 100 and the information processing apparatus 400 by using a communication apparatus, which is not illustrated.

The wheel speed sensor 14 is provided in, for example, a wheel of the electric vehicle 10 and detects a rotation speed of the wheel. The wheel speed sensor 14 outputs a detected rotation speed of the wheel to an arithmetic operation apparatus, which is not illustrated, and the arithmetic operation apparatus calculates the vehicle speed of the electric vehicle 10 from the output rotation speed of the wheel. The arithmetic operation apparatus transmits information of the calculated vehicle speed to the battery unit 100 by using a communication apparatus, which is not illustrated.

Although details will be described below, the electric vehicle 10 generates destination information regarding a destination, combines the destination information with current position information indicating the current position of the electric vehicle 10, and transmits the combined information to the information processing apparatus 400 by using the communication apparatus, which is not illustrated. The destination information includes, for example, position information indicating the destination of the electric vehicle 10. The electric vehicle 10 may generate electricity consumption information indicating the electricity consumption of the electric vehicle 10 based on an output of the battery sensor 12 or the like and transmit the electricity consumption information to the information processing apparatus 400 by using the communication apparatus, which is not illustrated.

<Battery Unit 100>

The battery unit 100 includes, the battery 120, a battery communicator 140, and a battery control apparatus 180. The battery 120 is a power storage device (secondary battery), for example, a lithium-ion battery, or the like. The battery 120 is mounted in the electric vehicle 10 and thereby supplies electric power for traveling to the electric vehicle 10. Electric power supplied by the battery 120 may be used as electric power for a purpose other than traveling.

The battery communicator 140 is a device that enables the electric vehicle 10 to communicate with the charging station 200. The battery communicator 140 can transmit and/or receive information to and/or from the electric vehicle 10 via a communication line since the battery unit 100 is mounted in the electric vehicle 10. The battery communicator 140 can transmit and/or receive information to and/or from the charging station 200 via a communication line since the battery 120 of the battery unit 100 is connected to a charger 230, which will be described below.

The battery control apparatus 180 includes, for example, a battery controller 182, a battery clock unit 184, and a battery storage unit 186. The battery controller 182 includes, for example, a battery management unit (BMU). The BMU controls charging and discharging of the battery 120. For example, when the battery unit 100 is stored in the charging station 200, the BMU controls charging of the battery 120, and when the battery unit 100 is mounted in the electric vehicle 10, the BMU controls charging/discharging of the battery 120. The battery storage unit 186 stores a battery ID. The battery ID is identification information of the battery unit 100 (or battery 120) composed of different numbers given to a plurality of battery units 100 (or batteries 120), for example, in order to identify the battery units 100 (or batteries 120) individually.

The battery controller 182 acquires detection results transmitted from the battery sensor 12 of the electric vehicle 10 by using the battery communicator 140. The battery controller 182 calculates a state of charge (SOC; also called a "charging rate") of the battery 120 based on the acquired detection results. The battery controller 182 saves the calculated SOC of the battery 120 in the battery storage unit 186. The battery controller 182 transmits information indicating the calculated SOC of the battery 120 to the electric vehicle 10 and also transmits the calculated SOC to the information processing apparatus 400 via the network NW.

The battery controller 182 acquires information of a vehicle speed of the electric vehicle 10 transmitted from the electric vehicle 10 by using the battery communicator 140.

The battery controller 182 calculates a movement distance of the electric vehicle 10 by accumulating the information of the acquired vehicle speed of the electric vehicle 10. The battery controller 182 saves the calculated movement distance of the electric vehicle 10 in the battery storage unit 186. The movement distance of the electric vehicle 10 may be calculated by the electric vehicle 10 and transmitted to the battery unit 100. The electric vehicle 10 may generate electricity consumption information indicating the electricity consumption of the electric vehicle 10 based on the movement distance of the electric vehicle 10 received from the battery unit 100 and the SOC of the battery 120 and transmit the electricity consumption information to the information processing apparatus 400 by using the communication apparatus, which is not illustrated.

The battery controller 182 acquires information indicating the user ID of the user possessing the electric vehicle 10, the information being transmitted by the charging station 200 that rents the battery unit 100, by using the battery communicator 140. The user ID is identification information of the user composed of different numbers that are given to each of a plurality of users, for example, in order to identify the users individually. The battery controller 182 saves the acquired information of the user ID in the battery storage unit 186.

<Charging Station 200>

The charging station 200 includes, for example, the charger 230, an authenticator/display 232, and a charging station control apparatus 240. The charger 230 is connected to the battery 120 of the battery unit 100 and supplies electric power from a grid to the battery 120. A power source for supplying electric power to the battery 120 is connected to the charger 230.

The charging station control apparatus 240 is realized by a processor, for example, a central processing unit (CPU), or the like, executing a program (software) saved in a charging station storage unit 250. Some or all of functional units included in the charging station control apparatus 240 may be realized by hardware (a circuit unit; including circuitry) such as a large scale integration (LSI), an application specific integrated circuit (ASIC), a field-programmable gate array (FPGA), or a graphics processing unit (GPU) or may be realized by cooperation of software with hardware. The program may be saved in a storage apparatus (non-transitory storage medium) such as a hard disk drive (HDD) or a flash memory in advance, may be saved in a detachable storage medium (non-transitory storage medium) such as a DVD or a CD-ROM, or may be installed when the storage medium is loaded on a drive apparatus.

The charging station storage unit 250 is realized by the above-described storage apparatus. The charging station storage unit 250 stores the charging station ID of the charging station 200 having the charging station control apparatus 240. The charging station ID is identification information of the charging station 200 composed of different numbers that are given to each of a plurality of charging stations 200, for example, in order to identify the charging stations 200 individually.

The charging station storage unit 250 saves battery management information 252. FIG. 3 is a table showing an example of the battery management information 252. The battery management information 252 is information in which battery IDs are associated with a SOC (%), reservation users, and reservation times. The SOC is the latest SOC of the batteries 120. The SOC included in the battery management information 252 is updated as charging of the batteries 120 progresses. Each reservation user indicates the user ID of a user who has reserved use of a corresponding battery 120. Each reservation time indicates a time for rent designated by a reservation user. The charging station storage unit 250 saves the battery management information 252 regarding all of the battery units 100 managed in the charging station 200.

The charging station communicator 242 is a device that communicates with the electric vehicle 10 and the information processing apparatus 400. The charging station communicator 242 can transmit and/or receive information to and/or from the battery unit 100 via a communication line since the battery 120 of the battery unit 100 is connected to the charger 230.

The charging station communicator 242 can transmit and/or receive information to and from the information processing apparatus 400 via the network NW. The charging station communicator 242 includes, for example, a radio module for connecting to a cellular network or a Wi-Fi network or a communication interface such as a network card for connecting to the network NW. The charging station communicator 242 transmits, for example, the battery management information 252 to the information processing apparatus 400.

A charging station controller 244 reads information stored in the battery storage unit 186 of the battery unit 100 via the charging station communicator 242 and the battery communicator 140 when the battery 120 of the battery unit 100 is connected to the charger 230. The information read by the charging station controller 244 includes, for example, battery IDs, user IDs, current (return-time) SOC (which will be referred to as return-time SOC below), and the like.

The charging station controller 244 calculates an amount of electric power for charging the battery 120 (an amount of charging) based on the information of the SOC or the like read from the battery unit 100 and outputs the information of the calculated amount of charging to a charging controller 246. The charging station controller 244 generates the battery management information 252 based on various kinds of information read from the battery storage unit 186 of the battery unit 100 and charging station IDs stored in the charging station storage unit 250.

The charging station controller 244 acquires reservation information transmitted by the information processing apparatus 400 by using the charging station communicator 242. The charging station controller 244 gets ready for authenticating a user who will rent the battery unit 100 when the information processing apparatus 400 transmits reservation information. The charging station controller 244 performs display control and authentication control of the authenticator/display 232 when, for example, the user corresponding to the reservation information that the charging station communicator 242 received arrives. The charging station controller 244 causes the authenticator/display 232 to display information regarding the battery unit 100 that will be rented to the reservation user after the user arrives at the charging station 200 and goes through authentication by the authenticator/display 232.

The charging controller 246 charges the battery 120 of the battery unit 100 connected to the charger 230 based on the information of the amount of charging or the like output by the charging station controller 244. The charging controller 246 charges the battery 120 with electric power until the battery 120 is fully charged. The charging controller 246 may derive the SOC of the battery 120 based on the amount of electric power with which the battery 120 has been charged by the charger 230 and update the battery management information 252 based on the derived SOC.

<Information Processing Apparatus 400>

The information processing apparatus 400 includes, for example, a communicator 410, a processor 420, and a storage unit 430. The communicator 410 can transmit and/or receive information to and/or from the electric vehicle 10, the charging station 200, and the mobile terminal 300 via the network NW. The communicator 410 includes, for example, a radio module for connecting to a cellular network or a Wi-Fi network or a communication interface such as a network card for connecting to the network NW. The communicator 410 receives various kinds of information transmitted from the electric vehicle 10, the charging station 200, and the mobile terminal 300.

The processor 420 includes, for example, an acquirer 421, a travel route predictor 422, a remaining charge predictor 423, a determiner 424, a selector 425, and a reservation unit 426. The processor 420 is realized by a processor, for example, a central processing unit (CPU), or the like, performing a program (software) saved in the storage unit 430. Some or all of functional units included in the processor 420 may be realized by hardware (a circuit unit; including circuitry) such as an LSI, an ASIC, an FPGA, or a GPU, or may be realized by cooperation of software with hardware. The program may be saved in a storage apparatus (non-transitory storage medium) such as an HDD or a flash memory in advance, may be saved in a detachable storage medium (non-transitory storage medium) such as a DVD or a CD-ROM, or may be installed when the storage medium is loaded on a drive apparatus. The storage unit 430 is realized by the above-described storage apparatus.

The storage unit 430 saves, for example, vehicle management information 431, battery management information 432, map information 433, and correspondence table information 434. The vehicle management information 431 is information generated based on information received from the electric vehicle 10. The battery management information 432 is battery management information received from the charging station 200. Since the battery management information 432 is the same as the battery management information 252 of the charging station 200, description thereof will be omitted. The map information 433 is information indicating the position of the charging station 200 on a map.

FIG. 4 is a table showing an example of contents of the vehicle management information 431. The vehicle management information 431 is information obtained by associating, for example, various sensor information, electricity consumption information, the latest SOC (an example of first information), destination information (an example of second information), reservation information with each vehicle ID. The vehicle ID, the various sensor information, the electricity consumption information, the latest SOC, and the destination information are, for example, information received from the electric vehicle 10. The latest SOC may be derived to the acquirer 421 based on the latest various sensors information, electricity consumption information, and the like. The reservation information is reservation information regarding renting of the battery 120. The reservation information includes the charging station ID indicating the charging station 200 at which renting has been reserved, the battery ID indicating the battery 120 reserved for the renting, and the reservation time for the reservation for renting, and the like.

The storage unit 430 stores information of the charging station IDs of the plurality of charging stations 200 and the locations of the respective charging stations 200.

The acquirer 421 acquires various kinds of information by using the communicator 410. The acquirer 421 acquires, for example, the vehicle ID, the various sensors information, the electricity consumption information, the latest SOC, and the destination information from the electric vehicle 10. The acquirer 421 saves the acquired various kinds of information in the vehicle management information 431 of the storage unit 430. The acquirer 421 may derive the SOC of the first battery mounted in the electric vehicle 10 based on the acquired various sensors information, electricity consumption information, and the like and thereby acquire the latest SOC of the electric vehicle 10.

The acquirer 421 may acquire a travel distance in a predetermined section on a travel route of the electric vehicle 10 predicted by the travel route predictor 422 based on the travel route, a movement distance of the electric vehicle 10, and the like. The predetermined section includes, for example, a section from the electric vehicle 10 to a replacement station or a destination, a section from a replacement station to the next replacement station, a section from a replacement station to a destination, and the like.

The travel route predictor 422 predicts a travel route of the electric vehicle 10 based on the destination information acquired from the acquirer 421. The travel route predictor 422 predicts, for example, the shortest route to the destination included in the destination information as a travel route of the electric vehicle 10.

The remaining charge predictor 423 predicts the remaining charge of the first battery at the time point of arrival at the charging station 200 on the travel route. For example, the remaining charge predictor 423 derives the amount of electric power necessary for traveling to the charging station 200 based on the travel distance from the current position to the charging station 200 on the travel route, the electricity consumption information of the electric vehicle 10, and the like.

For example, the remaining charge predictor 423 refers to the vehicle management information 431 to derive a predicted value $SOC_A$ after using an amount of electric power required to travel to the first charging station 200A on the travel route based on the latest $SOC_0$. Then, the remaining charge predictor 423 predicts the derived predicted value $SOC_A$ as the remaining charge of the first battery at the time point of arrival at the charging station 200A. Likewise, the remaining charge predictor 423 derives each of a predicted value $SOC_B$ of the first battery at the time point of arrival at the charging station 200B, a predicted value $SOC_C$ of the first battery at the time point of arrival at the charging station 200C, and a predicted value $SOC_D$ of the first battery at the time point of arrival at the charging station 200D. The remaining charge predictor 423 derives the predicted value $SOC_A$ to the predicted value $SOC_D$ when, for example, the electric vehicle 10 departs from the departure point P0.

The determiner 424 refers to, for example, the map information 433 indicating positions of the charging stations 200 on the map to determine a replacement station at which a second battery to be replaced with the first battery mounted in the electric vehicle 10 will be rented based on the travel route predicted by the travel route predictor 422. The second battery is a battery 120 among a plurality of batteries 120 managed in replacement stations, the battery to be rented to the electric vehicle 10 in the aforementioned replacement station.

The determiner 424 refers to, for example, the correspondence table information 434 to acquire a range of distance that the electric vehicle 10 can reach while leaving a predetermined SOC based on the latest SOC of the electric vehicle 10. The determiner 424 determines one of the charging stations 200 included the acquired range of distance as a replacement station. With this operation, the battery 120 can be replaced while leaving the predetermined SOC. The predetermined SOC can be arbitrarily set and, for example, is a value set to prevent degradation in the quality of the battery 120.

FIG. 5 is a table showing an example of contents of the correspondence table information 434. As shown in FIG. 5, the correspondence table information 434 is information in which travel distance ranges are associated with SOC ranges. An SOC range is information indicating a range of SOC. An SOC range is defined in, for example, a range of 10%. A travel distance range is a distance over which the electric vehicle 10 can travel while leaving a predetermined SOC in a case in which the latest SOC of the electric vehicle 10 falls within a corresponding SOC range. For example, the lower limit of a travel distance range is a distance over which the electric vehicle can travel while leaving a predetermined SOC in a case in which the electric vehicle travels with electric power in an amount corresponding to the lower limit of the corresponding SOC range, and the upper limit of a travel distance range is a distance over which the electric vehicle can travel while leaving a predetermined SOC in a case in which the electric vehicle travels with electric power in an amount corresponding to the upper limit of the corresponding SOC range. A correspondence table of SOC ranges and travel distance ranges may be prepared for each electric vehicle 10, or may be prepared in accordance with the type, electricity consumption, total travel distance, the year of manufacture of the electric vehicle 10, or the like.

In a case in which the latest SOC of the electric vehicle 10 is 75%, for example, the determiner 424 determines a charging station 200 located in the range of 70 to 80 km from the current position on a travel route predicted by the travel route predictor 422 as a replacement station. As described above, the determiner 424 may determine a replacement station based on a remaining charge of the first battery predicted by the remaining charge predictor 423.

The determiner 424 compares a predicted amount of the SOC of the first battery with a replacement threshold th1 with respect to the plurality of charging stations 200 on the travel route, in order of the charging stations closest to the electric vehicle 10. The determiner 424 may determine a charging station 200 for a predicted value of SOC of the first battery predicted by the remaining charge predictor 423 being less than the replacement threshold th1 as a replacement station. The replacement threshold th1 can be arbitrarily set and, for example, is a value set to prevent degradation in the quality of the battery 120. The determiner 424 determines the charging station 200A as a replacement station in a case in which, for example, the SOC of the first battery predicted by the remaining charge predictor 423 is less than the replacement threshold th1 (e.g., th1=30%). In a case that a predicted value $SOC_A$ of the first battery predicted by the remaining charge predictor 423 is higher than or equal to the replacement threshold th1, the determiner 424 determines whether a predicted value $SOC_B$ of the first battery predicted by the remaining charge predictor 423 is less than the replacement threshold th1. The determiner 424 determines the charging station 200B as a replacement station in a case in which the predicted value $SOC_B$ of the first battery is less than the replacement threshold th1.

In the present embodiment, the determiner 424 determines the next replacement station based on the latest SOC of the first battery mounted in the electric vehicle 10 each time there is an instruction from the user to use the sharing service or the first battery needs to be replaced with a second battery. However, the embodiment is not limited thereto, and the determiner 424 may determine, at a departure point, all of at least one replacement stations needed until the electric vehicle reaches a destination included in destination information on the premise that the first battery will be replaced with a fully charged second battery. This example will be described in a second embodiment.

The selector 425 selects a second battery to be rented in the replacement station based on, for example, the distance from the charging station 200 determined as the replacement station by the determiner 424 to the destination (or the distance to the next replacement station). When a second battery is selected by the selector 425, the second battery may be designated by specifying the battery ID or a battery 120 with a predetermined SOC or higher may be designated.

For example, the selector 425 refers to the correspondence table information 434 to acquire the SOC range associated with the travel distance range corresponding to the distance from the replacement station to the destination (or the distance to the next replacement station), and selects a battery 120 in the SOC falling within the acquired SOC range as a second battery. That is, the selector 425 selects a battery 120 in the SOC that enables the electric vehicle 10 to travel to the next replacement station at which the battery 120 will be replaced or the destination of the electric vehicle 10 as a second battery.

With the operation described above, the battery can be replaced with a battery that enables the vehicle to travel at least to the next replacement station or the destination since not all the batteries 120 present in the replacement station would be fully charged. With the operation described above, a battery 120 in the SOC suitable for travel to the destination (or the next replacement station) can be selected. In a case in which the replacement station does not have a battery 120 in the SOC corresponding to the SOC range acquired with reference to the correspondence table information 434, the selector 425 may select the battery 120 corresponding to the SOC range that is greater than or equal to the SOC range acquired with reference to the correspondence table information 434 and closest to the SOC range acquired with reference to the correspondence table information 434.

The selector 425 may select a second battery to be rented in the charging station 200 based on the predicted value of the remaining charge of the first battery at the time of arrival at the replacement station. The trend of decline in an amount of electric power of the electric vehicle 10 varies, for example, due to a deterioration state of the battery 120, a road traffic state, a way of driving, and the like. For this reason, there is a case in which a predicted value of the SOC of the first battery predicted as the battery remaining charge at the time of arrival at the replacement station determined by the determiner 424 has a difference from the relation between an SOC range and a travel distance range defined in the correspondence table information 434. In this case, by reviewing a second battery selected with reference to the correspondence table information 434 based on the predicted value of the remaining charge of the first battery, a second battery can be selected based on the predicted value of the SOC of the first battery at the time of arrival at the replacement station, and thus a battery 120 in the SOC suitable for travel to the destination (or the next replacement station) can be selected.

For example, the selector 425 selects a second battery immediately after the first replacement station is determined based on the distance from the first replacement station to the destination (or the distance from the first replacement station to a second replacement station) with reference to the correspondence table information 434. The first replacement station is a charging station 200 on the travel route of the electric vehicle 10 at which the battery 120 is replaced. The second replacement station is a charging station 200 on the travel route of the electric vehicle 10 at which the battery 120 is replaced next to the first replacement station.

In a case in which a travel distance from a current position to a destination on a travel route is 75 km, for example, the selector 425 selects a battery 120 in SOC in the range of 70 to 80% as a second battery. Then, the remaining charge predictor 423 predicts the SOC of the first battery when the electric vehicle arrives at the first replacement station at every predetermined time interval (e.g., 5 minutes). In a case in which a predicted value of the SOC of the first battery predicted by the remaining charge predictor 423 is less than 20%, the selector 425 increases the SOC range of the second battery that has already been selected by one level. The selector 425 selects, for example, a battery 120 in the SOC in the range of 80 to 90% as a second battery.

Among a plurality of electric vehicles 10 that will replace their batteries 120 in the charging stations 200, as a second battery for replacement by a second electric vehicle having a longer travel distance to the next charging station at which its battery 120 is replaced than that of a first electric vehicle or the destination, the selector 425 selects a battery in a higher SOC than a second battery for replacement by the first electric vehicle, based on information indicated by SOC of batteries 120 managed in the charging stations 200. With this operation, remaining batteries 120 can be preferentially rented to electric vehicles 10 going farther.

The reservation unit 426 reserves replacement for a battery in the replacement station determined by the determiner 424. Processes for reservation includes, for example, a process of determining an estimated time of arrival of the electric vehicle 10 at the replacement station as a reservation time, a process of setting a determined reservation time, the replacement station determined by the determiner 424, the second battery selected by the selector 425, and the like as reservation contents, a process of generating reservation information based on the set reservation contents, and the like. The reservation unit 426 transmits the generated reservation information to the replacement station by using the communicator 410.

<Electric Vehicle 10>

Figure 6:
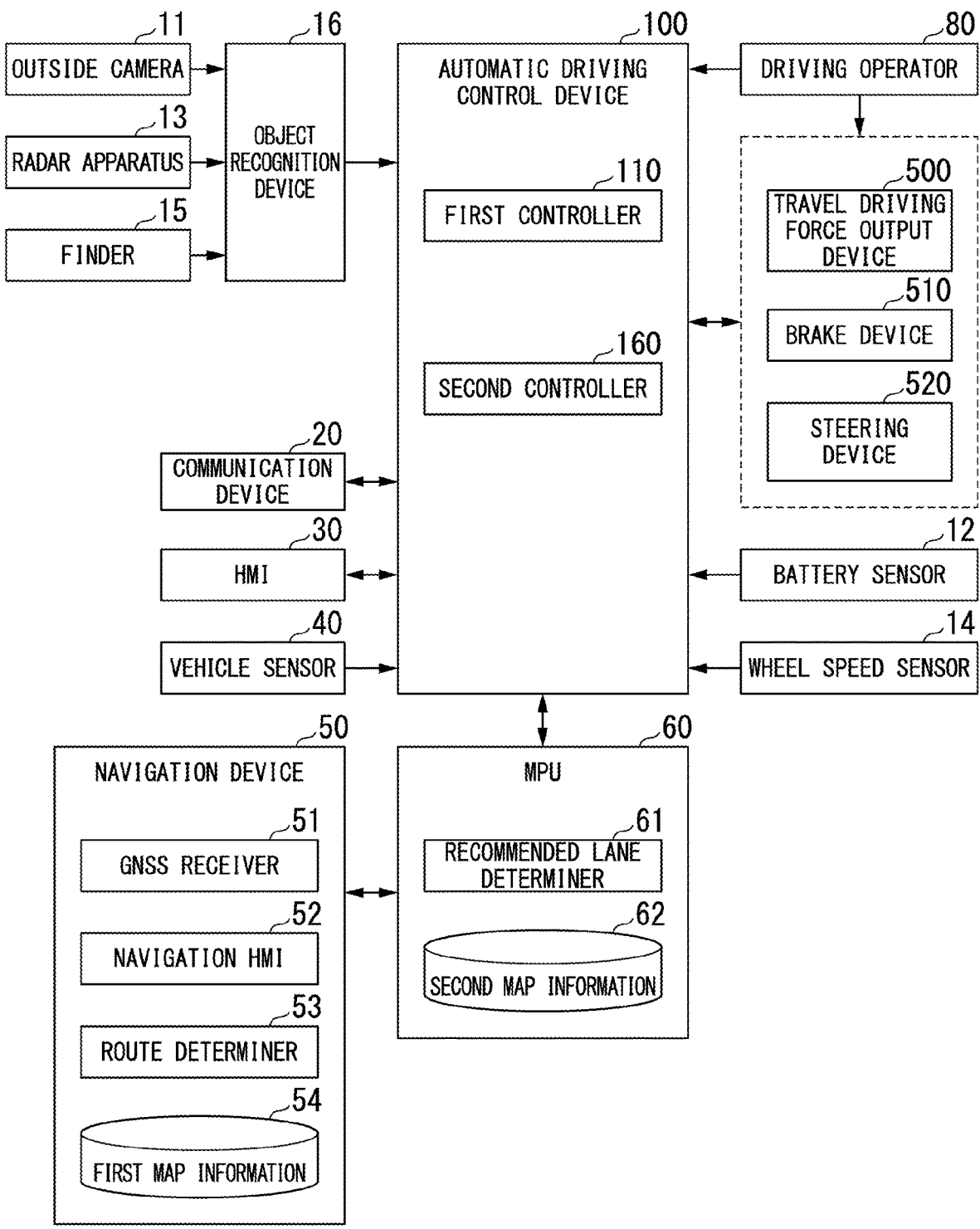
FIG. 6 is a configuration diagram of an electric vehicle.

Next, an example of a configurations of automatic driving of the electric vehicle 10 will be described. FIG. 6 is a configuration diagram of the electric vehicle 10. The electric vehicle 10 further includes, for example, a camera 11, a radar apparatus 13, a finder 15, an object recognition device 16, a communication device 20, a human-machine interface (HMI) 30, a vehicle sensor 40, a navigation device 50, a map positioning unit (MPU) 60, a driving operator 80, an automatic driving control device 100, a travel driving force output device 500, a brake device 510, and a steering device 520. These devices and equipment are connected to one another using a multiplex communication line or a serial communication line such as a controller area network (CAN) communication line, a wireless communication network, or the like. The configuration illustrated in FIG. 6 is merely an example, and some of the configuration may be omitted, or another constituent element may be further added thereto.

The camera 11 is a digital camera using a solid-state image sensor, for example, a charge coupled device (CCD), a complementary metal oxide semiconductor, (CMOS), or the like. The camera 11 is attached to an arbitrary part of the electric vehicle 10. In a case in which the front is to be captured, the camera 11 is attached to an upper part of the front windshield, a back surface of the room mirror, or the like. The camera 11 captures, for example, the peripheries of the electric vehicle 10 in a periodic and repetitive manner. The camera 11 may be a stereo camera.

The radar apparatus 13 detects at least a position (a distance and a direction) of an object by emitting radio waves such as millimeter waves to the peripheries of the electric vehicle 10 and detecting radio waves reflected from objects (reflective waves). The radar apparatus 13 is attached to an arbitrary part of the electric vehicle 10. The radar apparatus 13 may detect a position and a speed of an object using a frequency-modulated continuous-wave (FMCW) method.

The finder 15 is Light Detection and Ranging (LIDAR) sensor. The finder 15 irradiates a periphery of the electric vehicle 10 with light and measures the scattered light. The finder 15 detects a distance to a target based on the time from irradiation of light to reception of light. The light for irradiation is, for example, pulsed laser light. The finder 15 is attached to an arbitrary part of the electric vehicle 10.

The object recognition device 16 recognizes a position, a type, a speed, and the like of an object by performing sensor fusion processing on detection results from some or all of the camera 11, the radar apparatus 13, and the finder 15. The object recognition device 16 outputs a recognition result to the automatic driving control device 100. The object recognition device 16 outputs detection results of the camera 11, the radar apparatus 13, and the finder 15 to the automatic driving control device 100 as they are. The object recognition device 16 may be omitted from the vehicle system.

The communication device 20 uses, for example, a cellular network, a Wi-Fi network, Bluetooth (registered mark), Dedicated Short-Range Communications (DSRC), or the like, or communicates with various types of server devices.

The HMI 30 presents passengers of the electric vehicle 10 with various kinds of information and receives input operations made by the passengers. The HMI 30 includes, various display devices, a speaker, a buzzer, a touch panel, a switch, a key, and the like.

The vehicle sensor 40 includes a vehicle speed sensor that detects a speed of the electric vehicle 10, an acceleration sensor that detects an acceleration, a yaw rate sensor that detects an angular velocity around a vertical axis, a direction sensor that detects a direction of the electric vehicle 10, and the like.

The navigation device 50 includes, for example, a Global Navigation Satellite System (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the electric vehicle 10 based on a signal received from a GNSS satellite. A position of the electric vehicle 10 may be specified or supplemented with an inertial navigation system (INS) using an output of the vehicle sensor 40. The navigation HMI 52 includes, a display device, a speaker, a touch panel, a key, and the like. The navigation HMI 52 and the above-described HMI 30 may have a partial or entire common part. The route determiner 53 determines, for example, a route from a position of the electric vehicle 10 specified by the GNSS receiver 51 (or an input arbitrary position) to a destination input by a passenger using the navigation HMI 52 (which will be referred to as a route-on-map below) with reference to the first map information 54. The first map information 54 is, for example, information expressing road shapes with links indicating roads and nodes connected by the links. The first map information 54 may include curvature of the roads, point-of-interest (POI) information, and the like. A route-on-map is output to the MPU 60. The navigation device 50 may guide a route using the navigation HMI 52 based on the route-on-map. The navigation device 50 may be realized by, for example, a function of a terminal device such as a smartphone or a tablet terminal possessed by a passenger. The navigation device 50 may transmit a current position and a destination to a navigation server via the communication device 20 and may acquire the same route as the route-on-map from the navigation server.

The MPU 60 includes, for example, a recommended lane determiner 61 and retains second map information 62 in a storage device such as a hard disk drive (HDD) or a flash memory. The recommended lane determiner 61 divides the route-on-map provided from the navigation device 50 into a plurality of blocks (e.g., divides the route-on-map in units of 100 meters [m] in a vehicle progressing direction) and determines a recommended lane for each block with reference to the second map information 62. The recommended lane determiner 61 determines which lane from the left the vehicle is advised to travel. In a case in which there is a junction on the route-on-map, the recommended lane determiner 61 determines a recommended lane to lead the electric vehicle 10 to travel on a reasonable route for progressing to a branch destination.

The second map information 62 is highly accurate map information in comparison to the first map information 54. The second map information 62 includes, for example, information of a lane center, information of a lane boundary, and the like. The second map information 62 may include, road information, traffic regulation information, address information (address and zip codes), facility information, telephone number information, and the like. The second map information 62 may be frequently updated by the communication device 20 communicating with another device.

The driving operator 80 includes, for example, an accelerator pedal, a brake pedal, a shift lever, a steering wheel, a deformed steering wheel, a joystick, and other operators. A sensor for detecting an amount of an operation or presence of an operation is attached to the driving operator 80, and a detection result thereof is output to some or all of the automatic driving control device 100, a travel driving force output device 500, a brake device 510, and a steering device 520.

The passenger recognizer 90 includes, for example, a seating sensor, an in-cabin camera, a biometric authentication system, an image recognizer, and the like. The seating sensor includes a pressure sensor provided at a lower part of a seat, a tension sensor attached to a seat belt, and the like. The in-cabin camera is a charge coupled device (CCD) camera or a complementary metal oxide semiconductor (CMOS) camera provided inside the cabin. The image recognizer analyzes an image of the in-cabin camera and recognizes, the presence, a face orientation of a passenger on each seat, and the like.

The automatic driving control device 100 includes, for example, a first controller 110 and a second controller 160. The first controller 110 and the second controller 160 is realized by a processor, for example, a central processing unit (CPU), or the like, executing a program (software). Some or all of the constituent elements may be realized by hardware (a circuit unit; including circuitry) such as an LSI, an ASIC, an FPGA, or a GPU, or may be realized by cooperation of software with hardware. The program may be saved in a storage apparatus (a storage apparatus having a non-transitory storage medium) such as an HDD or a flash memory of the automatic driving control device 100 in advance, may be saved in a detachable storage medium such as a DVD or a CD-ROM, or may be installed in the HDD or the flash memory of the automatic driving control device 100 when the storage medium (a non-transitory storage medium) is loaded on a drive apparatus.

Figure 7:
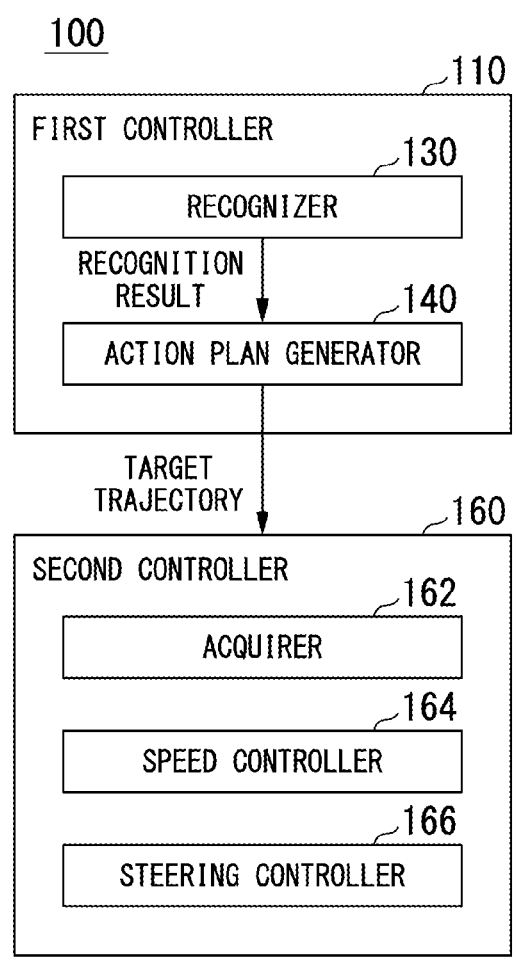
FIG. 7 is a functional configuration diagram of a first controller and a second controller.

FIG. 7 is a functional configuration diagram of the first controller 110 and the second controller 160. The first controller 110 includes, for example, a recognizer 130 and an action plan generator 140. The first controller 110 realizes, for example, a function using artificial intelligence (AI) and a function using a pre-given model in parallel. For example, a function of "recognizing an intersection" may be realized by performing recognition of the intersection using deep learning or the like and recognition of the intersection based on pre-given conditions (such as signals that can be pattern-matched, road signs, and the like) in parallel and comprehensively evaluating scores given to the two kinds of recognition. Consequently, reliability of automatic driving is ensured.

The recognizer 130 recognizes a state such as a position, a speed, an acceleration, and the like of an object around the electric vehicle 10 based on information input from the camera 11, the radar apparatus 13, and the finder 15 via the object recognition device 16. A position of an object is recognized as, for example, a position on an absolute coordinate system having a representative point of the electric vehicle 10 (a center of gravity, a center of a drive shaft, etc.) as the origin and is used for control. A position of an object may be indicated by a representative point such as a center of gravity or a corner of the object, or may be indicated by an expressed region. A "state" of an object may include an acceleration or a jerk of the object or an "action state" (e.g., whether the object is changing or is trying to change a lane).

The recognizer 130 recognizes, for example, a lane in which the electric vehicle 10 is traveling (travel lane). The recognizer 130 recognizes a travel lane by, for example, comparing the pattern of road dividing lines (e.g., the array of solid lines and dashed lines) obtained from the second map information 62 with the pattern of road dividing lines around the electric vehicle 10 recognized from images captured by the camera 11. The recognizer 130 is not limited to recognizing road dividing lines, and may recognize a travel lane by recognizing a runway boundary (road boundary) including a road dividing line, a road shoulder, curbstones, median strips, guardrails, or the like. A position of the electric vehicle 10 acquired from the navigation device 50 and a processing result from the INS may be added to the recognition. The recognizer 130 recognizes stop lines, obstacles, red lights, toll gates, and other road events.

The recognizer 130 recognizes a position and a posture of the electric vehicle 10 with respect to a travel lane when recognizing the travel lane. The recognizer 130 may recognize a deviation of a reference point of the electric vehicle 10 from the center of a lane, and an angle of the electric vehicle 10 formed with a line connected to the center of the lane in the progressing direction as a position and a posture of the electric vehicle 10 with respect to a travel lane. With regard to this, the recognizer 130 may recognize a position of the reference point of the electric vehicle 10 with respect to any side end part of a travel lane (a road dividing line or a road boundary) or the like as a position of the electric vehicle 10 with respect to the travel lane.

The action plan generator 140 generates a target trajectory on which the electric vehicle 10 will automatically travel in the future (without depending on operations of the driver) so that the electric vehicle 10 travels in a recommended lane determined by the recommended lane determiner 61 in principle and further can cope with situations around the electric vehicle 10. The target trajectory includes, for example, a speed element. The target trajectory is expressed by, for example, points that the electric vehicle 10 is supposed to reach (trajectory points) arranged in order. The trajectory points are points that the electric vehicle 10 is supposed to reach for each predetermined travel distance (e.g., about several meters [m]) in a road distance, and apart from this, a target speed and a target acceleration at predetermined sampling time intervals (e.g., about zero point several seconds [sec]) are generated as a part of the target trajectory. The trajectory points may be positions that the electric vehicle 10 is supposed to reach at the sampling time at predetermined sampling time intervals. In this case, information of the target speed and the target acceleration is expressed at the intervals of the trajectory points.

The action plan generator 140 may set an event of automatic driving in generating the target trajectory. Events of automatic driving include a constant-speed traveling event, a low-speed following event, a lane changing event, a branching event, a merging event, an overtaking event and the like. The action plan generator 140 generates a target trajectory according to an activated event.

The second controller 160 controls the travel driving force output device 500, the brake device 510, and a steering device 520 such that the electric vehicle 10 passes through the target trajectory generated by the action plan generator 140 on an estimated time.

The second controller 160 includes, for example, an acquirer 162, a speed controller 164, and a steering controller 166. The acquirer 162 acquires information of the target trajectory (trajectory points) generated by the action plan generator 140 and stores the information in a memory (not illustrated). The speed controller 164 controls the travel driving force output device 500 or the brake device 510 based on the speed element involved with the target trajectory stored in the memory. The steering controller 166 controls the steering device 520 according to the degree of bending of the target trajectory stored in the memory. Processes of the speed controller 164 and the steering controller 166 are realized by, for example, a combination of feedforward control and feedback control. As an example, the steering controller 166 performs a process by combining feedforward control according to the curvature of the road ahead of the electric vehicle 10 with feedback control based on a deviation thereof from the target trajectory.

Returning to FIG. 6, the travel driving force output device 500 outputs a travel driving force (torque) for the vehicle to travel to driving wheels. The travel driving force output device 500 includes, for example, a combination of an internal combustion engine, an electric motor, a transmission, and the like and an electronic control unit (ECU) that controls the aforementioned elements. The ECU controls the above-described constituent elements according to information input from the second controller 160 or information input from the driving operator 80.

The brake device 510 includes, for example, a brake caliper, a cylinder that transmits hydraulic pressure to the brake caliper, an electric motor that causes hydraulic pressure to be generated in the cylinder, and a brake ECU. The brake ECU controls the electric motor according to information input from the second controller 160 or information input from the driving operator 80 such that brake torque according to a braking operation is output to each of wheels. The brake device 510 may include, as a backup, a mechanism that transmits hydraulic pressure generated through an operation of the brake pedal included in the driving operator 80 to the cylinder via a master cylinder. The brake device 510 is not limited to the above-described configuration, and may be an electronically controlled hydraulic pressure brake device that transmits hydraulic pressure of a master cylinder to a cylinder by controlling an actuator according to information input from the second controller 160.

The steering device 520 includes, for example, a steering ECU and an electric motor. The electric motor changes, for example, a direction of a steering wheel by applying force to a rack-and-pinion mechanism. The steering ECU drives the electric motor according to information input from the second controller 160 or information input from the driving operator 80 and changes a direction of the steering wheel.

<Specific Usage Example of Sharing Service (Part 1)>

Figure 8:
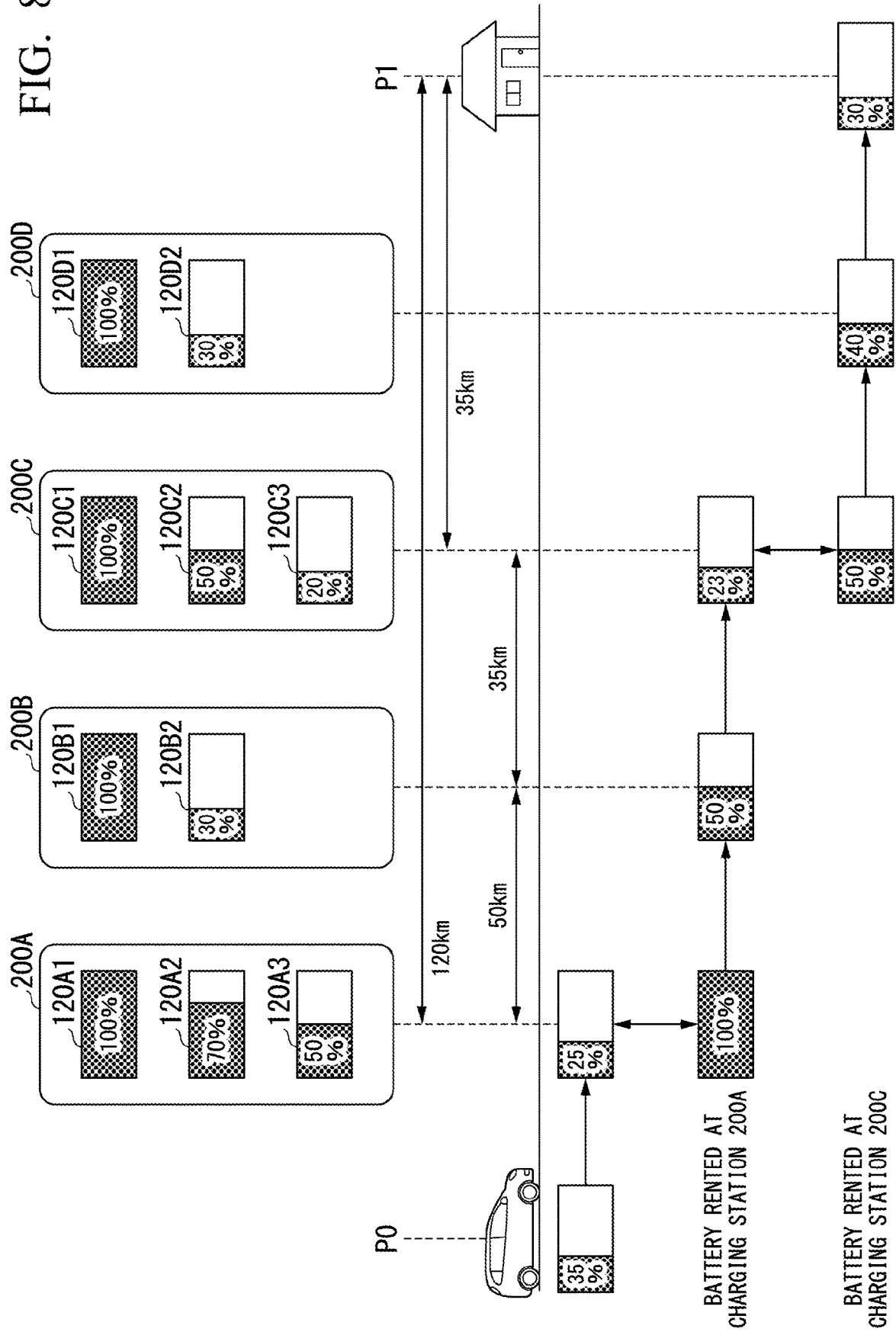
FIG. 8 is a diagram illustrating an overview of a specific usage example of a sharing service (part 1).

Next, a specific usage example of the sharing service (part 1) will be described. FIG. 8 is a diagram illustrating an overview of a specific usage example of the sharing service (part 1). First, the determiner 424 extracts charging stations 200A to 200D present on the travel route from a departure point P0 to the destination P1 of the electric vehicle 10 as replacement station candidates. The determiner 424 determines a replacement station from the replacement station candidates such that the battery 120 can be replaced at a timing at which replacement is required based on distances between the charging stations 200A to 200D and the distance from the departure point P0 to the destination P1. The determination is not limited thereto, and the determiner 424 may determine a charging station 200 at which replacement for the battery 120 will be needed as a replacement station based on a predicted value of SOC of the electric vehicle 10 when the electric vehicle arrives at each of the charging stations 200A to 200D. Here, an example in which a replacement station is determined based on a predicted value of SOC of the battery 120 will be described.

First, among the plurality of charging stations 200 on the travel route, the determiner 424 determines the charging station 200 that is closest to the departure point P0 at which the SOC of the first battery predicted by the remaining charge predictor 423 is less than the replacement threshold th1 as a first replacement station.

For example, the latest $SOC_0$ of the electric vehicle 10 is 35%, and the predicted value $SOC_A$ predicted by the remaining charge predictor 423 at the time of arrival at the charging station 200A is 25%. On the travel route predicted by the travel route predictor 422, the travel distance from the charging station 200A to the destination P1 is, for example, 120 km. There are a battery 120A1, a battery 120A2, and a battery 120A3 in the charging station 200A. The latest SOC values of the batteries 120A1, 120A2, and 120A3 are 100%, 70%, and 50%, respectively.

The determiner 424 determines the charging station 200A as a first replacement station since a predicted value $SOC_A$ (25%) predicted by the remaining charge predictor 423 is less than the replacement threshold th1 (30%). The travel distance from the charging station 200A to the destination P1 (120 km) exceeds the maximum travel distance range (90 to 100 km) prescribed in the correspondence table information 434. For this reason, among the batteries 120A1 to 120A3 present in the charging station 200A, the selector 425 selects the battery 120A1 corresponding to the maximum SOC range (90 to 100%) prescribed in the correspondence table information 434 as a second battery. In a case in which the SOC of the battery 120A2 reaches the maximum range (90 to 100%) when the electric vehicle 10 arrives at the charging station 200A, the battery 120A2 may be rented to the electric vehicle 10.

In a similar manner, the determiner 424 performs processing for determining a second replacement station at which the battery 120A1 that is a replacement at the charging station 200A will be replaced. The determiner 424 determines a second replacement station, for example, during the time from the arrival at the charging station 200A before arrival at the next charging station 200B. For example, the remaining charge predictor 423 derives a predicted value $SOC_B$ when the electric vehicle 10 arrives at the charging station 200B after the battery was replaced with the battery 120A1 in the SOC of 90 to 100% at the charging station 200A. For example, it is assumed that the predicted value $SOC_B$=50%. In this case, the determiner 424 does not determine the charging station 200B as a second replacement station since the predicted value $SOC_B$ (50%) is greater than or equal to the replacement threshold th1 (30%).

Next, the remaining charge predictor 423 derives a predicted value $SOC_C$ when the electric vehicle 10 arrives at the charging station 200C after the battery was replaced with the battery 120A1 in the SOC of 90 to 100% at the charging station 200A. For example, it is assumed that the predicted value $SOC_C$=23%. In this case, the determiner 424 determines the charging station 200C as a second replacement station since the predicted value $SOC_C$ (23%) is less than the replacement threshold th1 (30%).

The travel distance from the charging station 200C to the destination P1 (35 km) corresponds to the travel distance range (30 to 40 km) prescribed in the correspondence table information 434. For this reason, the selector 425 searches a battery 120 corresponding to the SOC range (30 to 40%) prescribed in the correspondence table information 434 as a second battery. However, there is not a battery 120 corresponding to the SOC range (30 to 40%) in the charging station 200C. In this case, the selector 425 refers to the correspondence table information 434 and selects, among batteries 120C1 to 120C3 present in the charging station 200C, the battery 120C2 in the SOC range that is greater than or equal to the SOC range (30 to 40%) and closest to the SOC range (30 to 40%). In a case in which the SOC of the battery 120C3 reaches the range (30 to 40%) when the electric vehicle 10 arrives at the charging station 200C, the battery 120C3 may be rented to the electric vehicle 10.

In a similar manner, the determiner 424 performs processing for determining a third replacement station at which the battery 120C2 that is a replacement at the charging station 200C will be replaced. The determiner 424 performs processing for determining a third replacement station, for example, during the time from the arrival at the charging station 200C before arrival at the next charging station 200D. For example, the remaining charge predictor 423 derives a predicted value $SOC_D$ when the electric vehicle 10 arrives at the charging station 200D after the battery was replaced with the battery 120C2 in the SOC of 50% at the charging station 200C. For example, it is assumed that the derived predicted value $SOC_D$=40%. In this case, the predicted value $SOC_D$ (40%) is greater than or equal to the replacement threshold th1 (30%). The distance from the charging station 200D to the destination P1 is 35 km, which is shorter than the range of the distance (50 to 60 km) over which the electric vehicle can travel in the SOC (50%) of the battery 120C2 while leaving a predetermined SOC. Therefore, the determiner 424 does not determine a third replacement station. In addition, the electric vehicle 10 can travel to the home at the destination P1 and can leave the SOC of the battery 120C2 at 30%.

<Flowchart>

Figure 9:
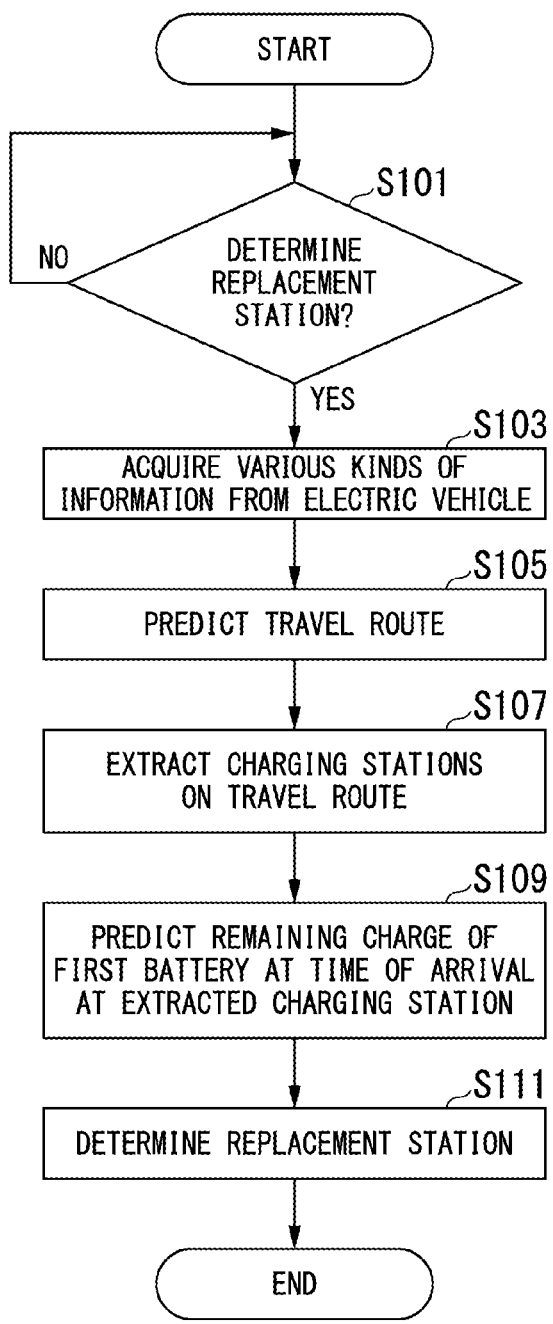
FIG. 9 is a flowchart showing an example of the flow of a replacement station determination process performed in the information processing apparatus.

FIG. 9 is a flowchart showing an example of the flow of a replacement station determination process performed in the information processing apparatus 400. First, the determiner 424 determines whether to determine a replacement station (step S101). For example, in a case in which a user instructs use of the sharing service using the mobile terminal 300 or the travel distance from a departure point to a destination on a travel route is greater than or equal to the replacement threshold th1, the determiner 424 determines to make determination of a replacement station.

In a case in which it is determined to make determination of a replacement station, the acquirer 421 acquires various kinds of information from the electric vehicle 10 (step S103). Next, the travel route predictor 422 predicts, for example, the shortest route to the destination included in the destination information as a travel route of the electric vehicle 10 (step S105). Then, the determiner 424 extracts the plurality of charging stations 200 present on the travel route from the departure point P0 to the destination P1 of the electric vehicle 10 as replacement station candidates (step S107). Next, the remaining charge predictor 423 predicts the remaining charge of the first battery at the time point of arrival at the charging station 200 on the travel route (step S109).

The determiner 424 may determine a replacement station based on a predicted value of the SOC of the first battery predicted by the remaining charge predictor 423 (step S111). For example, the determiner 424 compares the predicted value of the SOC of the first battery with the replacement threshold th1 in order of the plurality of charging stations 200 on the travel route being closer to the electric vehicle 10 and determines the charging station 200 at which the predicted value of the SOC of the first battery predicted by the remaining charge predictor 423 is less than the replacement threshold th1 as a replacement station.

Figure 10:
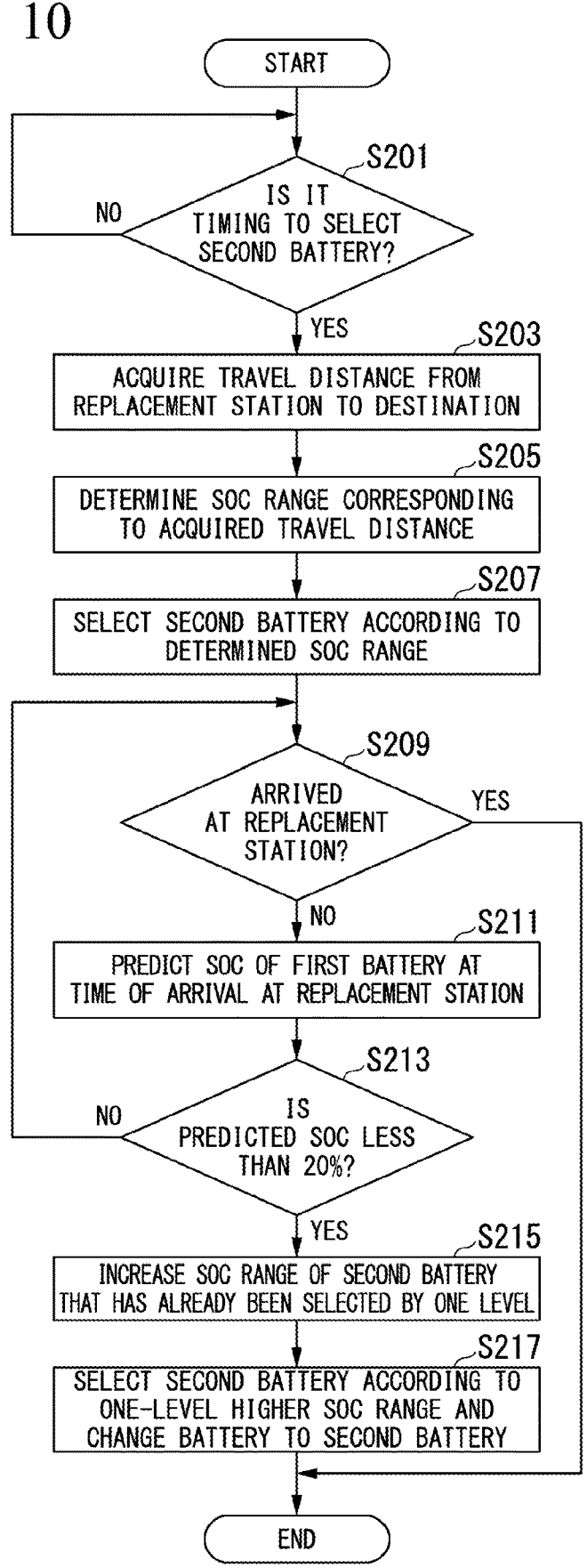
FIG. 10 is a flowchart showing an example of the flow of a second battery selection process performed in the information processing apparatus.

FIG. 10 is a flowchart showing an example of the flow of a second battery selection process performed in the information processing apparatus 400. First, the selector 425 determines whether it is a timing to select a second battery (step S201). In a case in which it is determined that the electric vehicle 10 has reached close to the replacement station in a predetermined distance based on the movement distance of the electric vehicle 10, for example, the selector 425 determines that it is the timing to select a second battery.

In a case in which it is the timing to select a second battery, the acquirer 421 derives the travel distance from the replacement station to the destination on the travel route predicted by the travel route predictor 422 (step S203). The selector 425 refers to the correspondence table information 434 and determines the SOC range corresponding to the travel distance from the replacement station to the destination (step S205). The selector 425 selects the second battery corresponding to the determined SOC range from batteries 120 present in the replacement station (step S207).

Next, the selector 425 determines whether the electric vehicle 10 has arrived at the replacement station (step S209). The selector 425 determines that the electric vehicle 10 has arrived at the replacement station in a case in which current position information received from the electric vehicle 10 indicates arrival at the replacement station or the movement distance of the electric vehicle 10 exceeds the distance to the replacement station. In a case in which the electric vehicle 10 has not arrived at the replacement station, the remaining charge predictor 423 derives a predicted value of the SOC of the first battery at the time of the arrival at the replacement station (step S211). Then, the selector 425 determines whether the derived predicted value of the SOC of the first battery is less than a predetermined value (e.g., 20%) (step S213).

In a case in which the derived predicted value of the SOC of the first battery is greater than or equal to the predetermined value in step S213, the selector 425 returns to step S209 and repeats the process. On the other hand, in a case in which the derived predicted value of the SOC of the first battery is less than the predetermined value in step S213, the selector 425 increases the SOC range of the second battery that has already been selected in step S205 by one level (step S215). The selector 425 refers to the correspondence table information 434 and selects the second battery corresponding to the one-level higher SOC range (step S217). That is, the second battery selected in step S207 is changed to the second battery selected in step S217.

Summary of Embodiment

As described above, the information processing apparatus 400 of the present embodiment includes the acquirer 421 that acquires battery remaining charge information indicating a remaining charge of the first battery that is detachably mounted in the electric vehicle and supplies electric power for traveling of the electric vehicle and destination information regarding a destination of the electric vehicle, the travel route predictor 422 that predicts a travel route of the electric vehicle based on the destination information acquired by the acquirer 421, and a determiner 424 that refers to map information indicating, on a map, positions of the plurality of charging stations at which a second battery to be rented to a user is charged and determines a charging station at which the second battery can be rented as a replacement for the first battery mounted in the electric vehicle based on the travel route predicted by the travel route predictor 422, and thus it can reduce a burden on the user imposed when using the replacement battery sharing service.

Second Embodiment

The determiner 423 is configured on the premise of replacement with a fully charged second battery, and determines at least one replacement station needed until the electric vehicle arrives at a destination included in destination information. The determiner 423 determines, at a departure point, all replacement stations needed until the electric vehicle arrives at a destination.

<Specific Usage Example of Sharing Service (Part 2)>

Next, the specific usage example of the sharing service (part 2) will be described. FIG. 11 is a diagram illustrating an overview of the specific usage example of the sharing service (part 2). Description of the same points as in the first embodiment will be omitted. First, the determiner 424 extracts the charging stations 200A to 200D present on a travel route from a departure point P0 to a destination P1 of an electric vehicle 10 as replacement station candidates. Among the plurality of charging stations 200 on the travel route, the determiner 424 determines the charging station 200A as a first replacement station and the charging station 200C as a second replacement station.

A method of determining a replacement station is different from that of the first embodiment in that a battery is replaced with a 100% charged battery in the replacement station. Thus, the determiner 424 can determine a sharing service use schedule in which the electric vehicle can travel to the destination with the minimum required number of replacements.

The selector 425 selects a 100% fully charged battery 120 present in the replacement station as a second battery. In a case in which there is not 100% fully charged battery 120, the selector 425 selects a battery 120 with the highest charge rate among batteries 120 present in the replacement station as a second battery. With the operation described above, a reservation for a battery 120 present in the replacement station can be made before arriving at the replacement station.

The above-described embodiments can be expressed as follows.

An information processing apparatus includes a storage device that stores a program and a hardware processor, in which, when the hardware processor executes the program stored in the storage device, first information indicating a remaining charge of a first battery that is detachably mounted in an electric vehicle and supplies electric power for traveling of the electric vehicle and second information regarding a destination of the electric vehicle are acquired, a travel route of the electric vehicle is predicted based on the acquired second information, map information indicating, on a map, positions of a plurality of charging stations at which a second battery to be rented to a user is charged is referred to and a charging station at which the second battery can be rented as a replacement for the first battery mounted in the electric vehicle is determined based on the predicted travel route.

Although exemplary embodiments for implementing the present invention have been described above using the embodiments, the present invention is not limited to the embodiments at all, and various modifications and substitutions can be added thereto within the scope not departing from the gist of the present invention.

What is claimed is:

1. An information processing apparatus comprising:
an acquirer configured to acquire first information indicating a remaining charge of a first battery that is detachably mounted in an electric vehicle and that supplies electric power for traveling of the electric vehicle and second information regarding a destination of the electric vehicle;
a travel route predictor configured to predict a travel route of the electric vehicle based on the second information acquired by the acquirer;
a determiner configured to refer to map information indicating, on a map, positions of a plurality of charging stations at which a second battery to be rented is charged and to determine a charging station, of the plurality of charging stations, at which the second battery can be rented as a replacement for the first battery mounted in the electric vehicle based on the travel route predicted by the travel route predictor;
a remaining charge predictor configured to predict a remaining charge of the first battery at a time point of arrival at the charging station; and
a selector configured to select the second battery to be rented at the charging station based on the remaining charge of the first battery predicted by the remaining charge predictor,
wherein the selector is configured to select the second battery corresponding to a one-level higher state of charge (SOC) range than a previously selected second battery in response to a determination that the remaining charge of the first battery predicted by the remaining charge predictor is less than a reference value.

2. The information processing apparatus according to claim 1, wherein the selector selects, as the second battery, a battery from a plurality of second batteries, the battery having a remaining charge determined to be sufficient for the electric vehicle to travel to a charging station at which it is predicted the electric vehicle will next have the battery replaced or to the destination of the electric vehicle.

3. The information processing apparatus according to claim 1, wherein, in a case in which the selector selects a second battery for replacement for a second electric vehicle having a longer travel distance to a charging station at which a battery is replaced next or a longer travel distance to a destination than a first electric vehicle among a plurality of electric vehicles with a battery to be replaced at the charging station, the selector selects a battery having a larger remaining charge than the second battery for replacement for the first electric vehicle based on information indicating a remaining charge of the second battery at the charging station.

4. An information processing method for a computer, the method comprising:
  acquiring first information indicating a remaining charge of a first battery that is detachably mounted in an electric vehicle and that supplies electric power for traveling of the electric vehicle and second information regarding a destination of the electric vehicle;
  predicting a travel route of the electric vehicle based on the second information;
  referring to map information indicating, on a map, positions of a plurality of charging stations at which a second battery to be rented is charged and determining a charging station, from among the plurality of charging stations, at which the second battery can be rented as a replacement for the first battery based on the travel route;
  predicting a remaining charge of the first battery at a time point of arrival at the charging station;
  selecting the second battery to be rented at the charging station based on the remaining charge of the first battery predicted by the predicting; and
  in response to determining that the remaining charge of the first battery predicted by the predicting is less than a reference value, selecting the second battery corresponding to a one-level higher state of charge (SOC) range than a previously selected second battery.

5. A non-transitory computer-readable transitory storage medium for storing a program causing a computer to perform:
  acquiring first information indicating a remaining charge of a first battery that is detachably mounted in an electric vehicle and supplies electric power for traveling of the electric vehicle and second information regarding a destination of the electric vehicle;
  predicting a travel route of the electric vehicle based on the second information;
  referring to map information indicating, on a map, positions of a plurality of charging stations at which a second battery to be rented is charged and determining a charging station, of the plurality of charging stations, at which the second battery can be rented as a replacement for the first battery based on the travel route;
  predicting a remaining charge of the first battery at a time point of arrival at the charging station;
  selecting the second battery to be rented at the charging station based on the remaining charge of the first battery predicted by the predicting; and
  in response to determining that the remaining charge of the first battery predicted by the predicting is less than a reference value, selecting the second battery corresponding to a one-level higher state of charge (SOC) range than a previously selected second battery.

\* \* \* \* \*